July 21, 1931.  D. D. CHASE  1,815,832
DYNAMO ELECTRIC MACHINE WINDING
Original Filed May 9, 1928
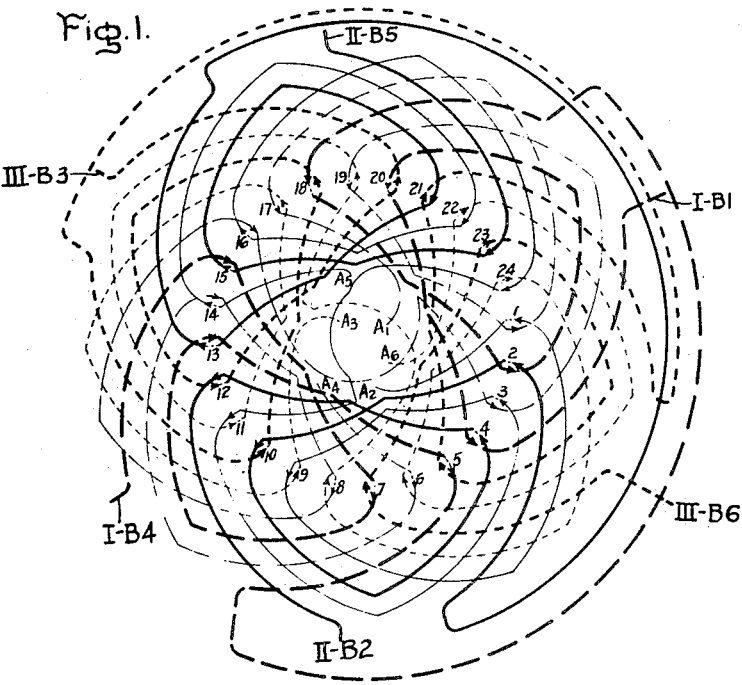
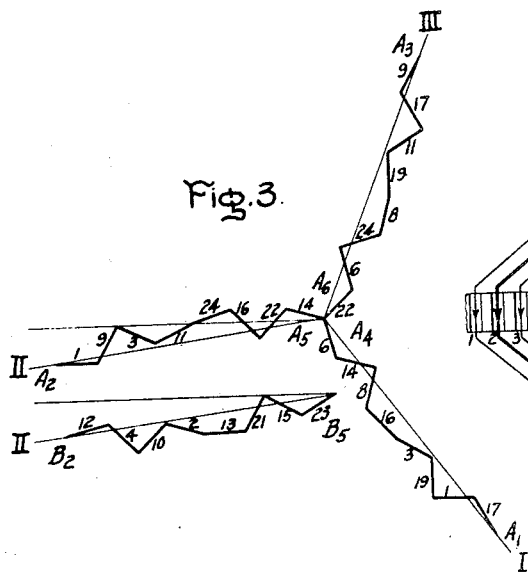
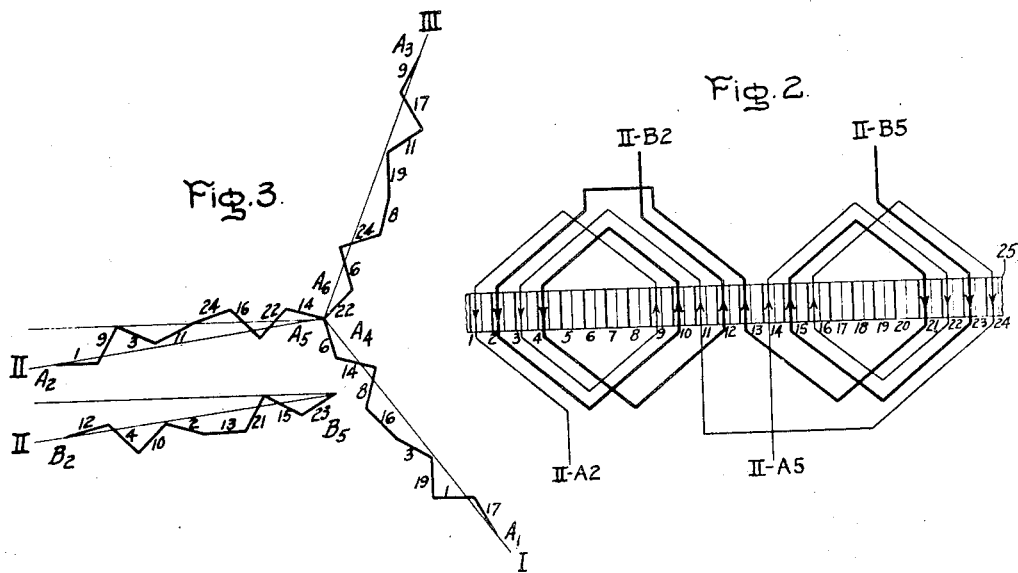
Inventor:
Delmar D. Chase,
by Charles E. Tullar
His Attorney.

Patented July 21, 1931

1,815,832

UNITED STATES PATENT OFFICE

DELMAR D. CHASE, OF SCHENECTADY, NEW YORK, ASSIGNOR TO GENERAL ELECTRIC COMPANY, A CORPORATION OF NEW YORK

DYNAMO-ELECTRIC MACHINE WINDING

Application filed May 9, 1928, Serial No. 276,467. Renewed May 7, 1931.

My invention relates to the windings of dynamo-electric machines and more particularly to armature windings for alternating-current dynamo-electric machines of the synchronous type.

It is an object of my invention to provide a dynamo-electric machine with a winding comprising a plurality of independent parts or circuits, each of which may be wound for different voltages or a different number of phases, and so arranged that any part or circuit may be satisfactorily operated alone, or if desired all parts or circuits may be operated simultaneously as independent circuits or connected in parallel when said parts are exactly similar for operation as a single multiple circuit winding.

Another object of my invention is to provide a winding for an alternating current generator of the synchronous type which consists of two parts or circuits each of which when connected to different external circuits can supply equal or unequal loads to said external circuits without causing mechanical or magnetic unbalance in the dynamo-electric machine and in which the circuits or parts are magnetically coupled in a manner to introduce reactance between the separate circuits and permit power flow therebetween within safe operating limits.

In one of its immediate commercial applications my invention is particularly suitable for use in connection with generators for interconnecting bus sections of busbar systems in central generating stations or substations as described and claimed in an application of Theophilus F. Barton, Serial No. 276,469, filed May 9, 1928, and assigned to the assignee of the present application, and although the following description is directed in certain instances to this particular application of my invention it will be apparent that my invention is of general application to generators and motors for other systems of distribution.

A simple embodiment of my invention for a double winding generator having the standard stator core structure comprises two separate circuits arranged in alternate slots with both circuits distributed around the complete periphery of the stator core. However, since the voltages in the two circuits under one pole are out of phase by an angle corresponding to one slot pitch due to the alternate location of the coil sides of each circuit, it is necessary to correct for this condition. One method which I have found suitable is to alternate the lead of the circuits in adjacent phase belts. In this way, a voltage balance between circuits is obtained on any machine on which two balanced circuits can normally be obtained and since each circuit is distributed around the complete periphery of the stator core perfect magnetic balance is obtained. The winding requires no additional insulation or space above that required for a similar winding of standard machines except for the additional number and special arrangement of the end connections and leads.

My invention will be better understood by reference to the following description taken in connection with the accompanying drawings and its scope will be pointed out in the appended claims.

In the drawings, Fig. 1 is a diagrammatic representation of a winding comprising two independent three-phase circuits embodying my invention, Fig. 2 is a diagrammatic development on a plane surface of a portion of the winding arrangement for a single phase of the two circuits shown in Fig. 1, and Fig. 3 is a vectorial representation of coil-side voltages to show the phase relation and balance between voltages in the two circuits.

Referring to Fig. 1 of the drawings, I have here represented a two-layer lap winding for a two pole, two circuit, three phase alternator. There are in this particular instance 24 slots with fractional pitch coils of $\frac{2}{3}$ pitch but it will be understood that my invention is not limited to any particular number of slots or particular coil pitch and may be used with a full slot or fractional slot winding. The two circuits are identified respectively by the letters A and B, the different phases by Roman numerals I, II and III, and the different phase windings of each circuit are identified by the circuit-letter designation and a numeral indicating the beginning and end of each winding. Thus the free terminals of the phase windings of circuits A and B are designated at A1, A2 and A3, and B1, B2 and B3, respectively, and the common terminals or neutral ends are designated as A4, A5 and A6, and B4, B5 and B6, respectively. Phase I, circuit A is thus identified as A1—A4, phase II as A2—A5, and phase III as A3—A6. Similarly phase I, circuit B, is identified as B1—B4, phase II as B2—B5 and phase III as B3—B6. The common terminals A4, A5 and A6, and B4, B5 and B6 may be connected in a manner to connect the respective circuits in star or delta as desired. To facilitate reading the drawings the several phase windings are indicated by lines of different characters. Thus phase I, circuit A is shown in light dash lines, phase II in light full lines and phase III in light broken lines. Similarly, phase I, circuit B is shown in heavy dash lines, phase II in heavy full lines and phase III in heavy broken lines. The slots are designated by numerals 1 to 24 inclusive and since I have represented a two-layer winding the coil side in the bottom of each slot is shown dotted.

It is, of course, understood that any suitable form of cooperating secondary or field winding such as a salient pole direct current rotor, a squirrel cage rotor or a wound rotor may be utilized to render the dynamo-electric machine complete, but since such windings and structures are well known it is not considered essential to describe them in any further detail.

In Fig. 2 of the drawings I have shown phase II of circuits A and B of Fig. 1 in a diagrammatic development on a plane surface to facilitate an understanding of the arrangement of the coils. In the drawings 25 represents the core of the armature winding which in practice would ordinarily be the stator and which would be constructed like the stator of a standard alternating current dynamo-electric machine which as well known in the art consists of a laminated core slotted to receive the winding. In accordance with my invention the coil sides of the respective phase belts of each circuit are placed in alternate slots around the machine. Thus if we consider phase II of circuit A and assume current to flow at any instant from the common terminal A5 toward the free terminal A2 the relative direction of currents in the coil sides will be indicated by the arrows and the circuit from A5 to A2 in consecutive order of coil sides designated by slot numbers will be 14, 22, 16, 24, 11, 3, 9 and 1. If we now consider phase II of circuit B and make the same assumptions as to current direction the circuit from B5 to B2 in consecutive order of coil sides designated by slot numbers will be 23, 15, 21, 13, 2, 10, 4 and 12. By inspection of the drawings reading from left to right it will be observed that coil sides of circuit A occupy slots 1, 3, 9, 11, 14, 16, 22 and 24 while coil sides of circuit B occupy slots 2, 4, 10, 12, 13, 15, 21 and 23. Thus it will be observed that if the phase belt, or group of conductors belonging to one phase and corresponding to one pole in the center of the diagram is considered, the coil side of circuit A will be seen to be leading in slot 9, while in the next succeeding phase belt of circuits A and B proceeding from left to right it will be seen that the coil side of circuit B is leading in slot 21.

It is to be understood, however, that my invention is not limited to the arrangement of the coil sides of corresponding phases of different circuits in alternate slots and although this arrangement is preferred for use in generators for interconnecting bus sections on account of the particular value of reactance obtained between circuits, other arrangements of interspersing the coil sides of different circuits, as for example, two coil sides of a given circuit placed in adjacent slots succeeded by two coil sides of another circuit of the corresponding phase in the next two adjacent slots may be used, if preferred, without departing from my invention in its broader aspects. It will also occur to those skilled in the art that it would not be necessary to alternate the lead of the circuits in adjacent phase belts since in a machine with more than two poles one circuit may be permitted to lead under two poles and then lag under the next two succeeding poles. The purpose of changing the lead of the different circuits in different phase belts is to obtain a predetermined relation between the magnitude and phase of the voltages of circuits of corresponding phases, which in the particular embodiment shown is an equal and in-phase relation of the voltages of the two circuits of a given phase.

In Fig. 3 the vectorial relation of the coil side voltages of each phase of both circuits is shown to illustrate graphically that voltage balance is obtained and the voltages of each phase winding of the respective circuits have the same phase relation. In order to simplify the drawings only phase II of circuits A and B are compared. Each coil side voltage vector is represented by numerals corresponding to the slot occupied by the coil side. Thus the coil-side voltage vectors from the common terminal A5 to the free terminal A2 of phase II, circuit A, is 14, 22, 16, 24, 11, 3, 9 and 1. It will be understood that the vector designated by 14, for example, represents the electromotive force induced in the conductors comprising one side of a coil, and that the succeeding numerals indicate the electromotive force induced in the conductors comprising the other coil sides of the particular circuit and phase, so that the vector sum of all the vectors represents the magnitude and phase position of the voltage of phase II, circuit A. Similarly, the coil-side voltage vectors from the common terminal B5 to B2 of phase II, circuit B, is 23, 15, 21, 13, 2, 10, 4 and 12 and the vector sum of these vectors gives the magnitude and phase position of the voltage of phase II, circuit B. It will be observed that the voltages are of equal magnitude and in phase. A similar comparison of the other phases of the two circuits will reveal the same results, but it is believed unnecessary to show this in the diagram.

A dynamo-electric machine equipped with a winding in accordance with my invention in addition to generating power in each winding and transferring power through the unit as a transformer when interconnecting bus sections may also be operated to vary the power factor by a variation in field excitation so as to permit operation within a limited variation of voltage on different bus sections depending upon the active and reactive kilovolt-amperes carried by the unit. Furthermore, a winding of this type may be utilized for synchronous motor construction to enable starting without the use of the usual autotransformer starter as described and claimed in an application for United States Letters Patent of Philip L. Alger, Serial No. 431,322, filed February 25, 1930, and assigned to the assignee of the present application. The motor can be started with only one winding in use or with both windings in series. In the first case the primary slot reactance will be substantially double the value for the two circuits in parallel and in the second case the reactance will be substantially four times the reactance of the two circuits in parallel. Thus this arrangement will give reduced starting current with results comparable to the use of a series external reactance.

While I have shown and described a particular embodiment of my invention, it will be obvious to those skilled in the art that changes and modifications may be made within the scope of my invention and I, therefore, aim in the appended claims to cover all such changes and modifications as fall within the spirit and scope of my invention.

What I claim as new and desire to secure by Letters Patent of the United States, is:—

1. In a dynamo-electric machine having a slotted magnetic member, a winding for said magnetic member having a plurality of independent similar phase circuits under every pole with coil sides of different circuits of similar phase interspersed in different slots in the same order of arrangement under each pole successively about the periphery of said magnetic member.

2. In a dynamo-electric machine having a slotted magnetic member, a winding for said magnetic member having a plurality of independent similar phase circuits under every pole with coil sides of different circuits of similar phase arranged successively in the same order of arrangement under each pole in different slots in close proximity about the periphery of said magnetic member.

3. In a dynamo-electric machine having a slotted magnetic member, a winding for said magnetic member having a plurality of independent similar phase circuits under every pole with all coils of equal pitch and coil sides of different circuits of similar phase arranged in alternate slots about the periphery of said magnetic member.

4. In a synchronous alternating-current dynamo-electric machine comprising a slotted stator core member, a polyphase winding for said stator core having two separately insulated circuits for each phase with all coils of equal pitch and coil sides of the respective windings of similar phases arranged in alternate slots about the periphery of said stator core.

5. In a dynamo-electric machine having a slotted magnetic member, a winding for said magnetic member having a plurality of independent similar phase circuits for each pole with all coils of equal pitch and coil sides of different circuits of similar phase interspersed in different slots under each pole successively in the same order about the periphery of said magnetic member and having predetermined coil sides of given circuits of similar phase interchanged in the order of succession in a predetermined direction of progression around said magnetic member at predetermined points for obtaining a predetermined relation between the magnitude and phase of the voltages for each group of similar phase circuits.

6. In an alternating-current dynamo-electric machine having a slotted magnetic member, a polyphase winding for said magnetic member having two independent circuits for each phase per pole with all coils of equal pitch and coil sides of the respective windings of similar phases arranged in alternate slots about the periphery of said stator core and having the order of lead of different circuits of the same phase interchanged at intervals at the beginning of phase belts proceeding in a predetermined direction of progression around said magnetic member in a manner to obtain equal and in-phase voltages for similar phase windings of said circuits.

7. In a synchronous alternating-current dynamo-electric machine having a slotted stator core member, a winding for said stator core comprising two complete and independent polyphase circuits with all coils of equal pitch and coil sides of the respective circuits of each phase belt of similar phase circuits arranged in alternate slots about the periphery of said stator core and having the order of lead of different circuits interchanged at the beginning of adjacent phase belts in a manner to obtain equal and in-phase voltages for similar phase windings of said circuits.

8. In combination, an alternating current dynamo-electric machine having a slotted magnetic member, a polyphase winding for said magnetic member having a plurality of circuits for each phase with coil sides of a phase belt of one circuit of a given phase alternating with coil sides of a phase belt of another circuit of similar phase and arranged in the same order about the periphery of said magnetic member under every pole of said dynamo-electric machine.

9. In combination, a dynamo-electric machine having a slotted magnetic member, a polyphase winding for said magnetic member having a plurality of circuits for each phase with successive coil sides of each phase belt spaced by a slot, the intervening slots being occupied by other phase belts.

10. In combination, an alternating current dynamo-electric machine having a slotted magnetic member, a polyphase winding for said magnetic member having a plurality of separately insulated circuits for each phase with successive coil sides of each phase belt spaced by a slot and with the intervening slots occupied by the phase belt of a circuit of similar phase.

In witness whereof, I have hereunto set my hand this 25th day of April, 1928.

DELMAR D. CHASE.